(12) United States Patent
Goin et al.

(10) Patent No.: US 8,725,844 B2
(45) Date of Patent: May 13, 2014

(54) METHOD AND SYSTEM FOR ADJUSTING THE RELATIVE VALUE OF SYSTEM CONFIGURATION RECOMMENDATIONS

(75) Inventors: Todd M. Goin, Loveland, CO (US); Thomas Joseph Moos, Windsor, CO (US); Christopher D. Hansen, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2735 days.

(21) Appl. No.: 10/701,869

(22) Filed: Nov. 5, 2003

(65) Prior Publication Data

US 2005/0097517 A1 May 5, 2005

(51) Int. Cl.
*G06F 15/177* (2006.01)

(52) U.S. Cl.
USPC ............................ 709/220; 709/223; 709/224

(58) Field of Classification Search
USPC ......................................... 709/220, 223, 224
See application file for complete search history.

(56) References Cited

U.S. PATENT DOCUMENTS

| | | | |
|---|---|---|---|
| 6,282,175 B1 * | 8/2001 | Steele et al. | 370/254 |
| 6,609,083 B2 | 8/2003 | Enck et al. | |
| 6,678,639 B2 * | 1/2004 | Little et al. | 702/188 |
| 6,930,785 B1 * | 8/2005 | Weyand et al. | 358/1.1 |
| 7,158,248 B2 * | 1/2007 | Smith et al. | 358/1.15 |
| 7,483,374 B2 * | 1/2009 | Nilakantan et al. | 370/235 |
| 7,724,670 B2 * | 5/2010 | Nilakantan et al. | 370/235 |
| 2002/0089528 A1 * | 7/2002 | Hay et al. | 345/712 |
| 2002/0138443 A1 * | 9/2002 | Schran et al. | 705/64 |
| 2002/0161861 A1 * | 10/2002 | Greuel | 709/220 |
| 2003/0135609 A1 * | 7/2003 | Carlson et al. | 709/224 |
| 2003/0149756 A1 * | 8/2003 | Grieve et al. | 709/223 |
| 2004/0225662 A1 * | 11/2004 | Nojima | 707/10 |
| 2005/0086645 A1 * | 4/2005 | Diao et al. | 717/127 |

* cited by examiner

*Primary Examiner* — Backhean Tiv (57) ABSTRACT

A method and system are provided for proposing advice consisting of corrective actions and enhancements to address a detected problem or measured degradation in the operation of a computer based on collected configuration and performance data. After the advice is proposed, the method and/or system automatically detects when and in what form the advice was implemented, and rates the efficacy of the implementation action based on subsequent collection and measurement of performance. The method and/or system is then able to adjust the importance of the advice relative to other advice.

14 Claims, 6 Drawing Sheets

METHOD AND SYSTEM FOR ADJUSTING THE RELATIVE VALUE OF SYSTEM CONFIGURATION RECOMMENDATIONS

FIELD OF THE INVENTION

The present invention relates generally to the field of systems management.

BACKGROUND OF THE INVENTION

Computer networks are becoming larger and more complex. Network management of computer networks often involves monitoring deployed nodes on the network (e.g., computers, servers, routers, sub-networks, network enabled devices, and the like). This monitoring process may involve a variety of parameters that are important to the system manager and the health of the network.

Monitoring performed by a client network management system can include measuring and collecting performance data of servers and other computer systems in the network. Performance measurement and system health monitors can measure and collect data needed to diagnose a problem with a system on the network. Performance measurement and system health monitors can use a measurement engine that acquires desired system metrics (e.g., CPU utilization, percentage of memory used, and the like). This data can then be used for generating performance reports and for aiding system operators in diagnosing system problems such as a memory bottleneck. Those skilled in the art will appreciate that a significant amount of data may be necessary to diagnose potential system problems.

Examples of known performance measurement and system health monitors can include commercially available software systems, such as MeasureWare available from Hewlett-Packard Company and Patrol available from BMC Software, Inc. Known performance measurement and system health monitors typically require the customer to define performance thresholds. When performance crosses the defined thresholds, an alert is generated to notify system administrators or support personnel, perhaps accompanied by a static set of recommendations or corrective actions.

Threshold-based performance monitoring is reactive in the sense that customers are not made aware of an emerging problem until a threshold is reached. Experts can be assigned to customers with performance problems, however they are usually limited in number and limited in how many customers can be helped. Known systems and methods do not causally link performance improvement or degradation with configuration changes that may be a factor. Such systems and methods require expertise in the customer's information technology (IT) staff to evaluate relative merits of static advice sets to determine what course of action should be attempted first. One customer does not automatically benefit from learning at other customer sites because prior threshold-based performance monitoring is localized to a customer site.

SUMMARY OF THE INVENTION

Briefly summarized, an exemplary embodiment of the invention relates to a method for adjusting the relative value of system configuration recommendations. The method can include identifying system configuration changes in a system, obtaining performance metrics for the system before and after system configuration changes are implemented, and assessing the effectiveness of system configuration changes based on the obtained performance metrics.

Another embodiment relates to a system including hardware components in a computer system, installed software in the computer system, configuration settings indicating configuration conditions for the hardware components and the installed software, and programmed instructions. The programmed instructions are configured to identify implemented configuration changes in the computer system, collect performance metrics associated with the computer system having the identified implemented configuration changes, and weight effectiveness of the identified implemented configuration changes.

Another embodiment relates to a system for adjusting relative value of implemented configuration changes on computer systems in a network. The system includes means for obtaining configuration information for the computer systems in the network, means for obtaining performance data for the computer systems in the network, means for recommending configuration changes to one of the computer systems in the network, means for obtaining performance data for the one of the computer system after implementation of recommended configuration changes, and means for adjusting relative value of the recommended configuration changes based on an evaluation of the performance data after implementation of recommended configuration changes.

DETAILED DESCRIPTION OF EXEMPLARY EMBODIMENTS

Figure 1:
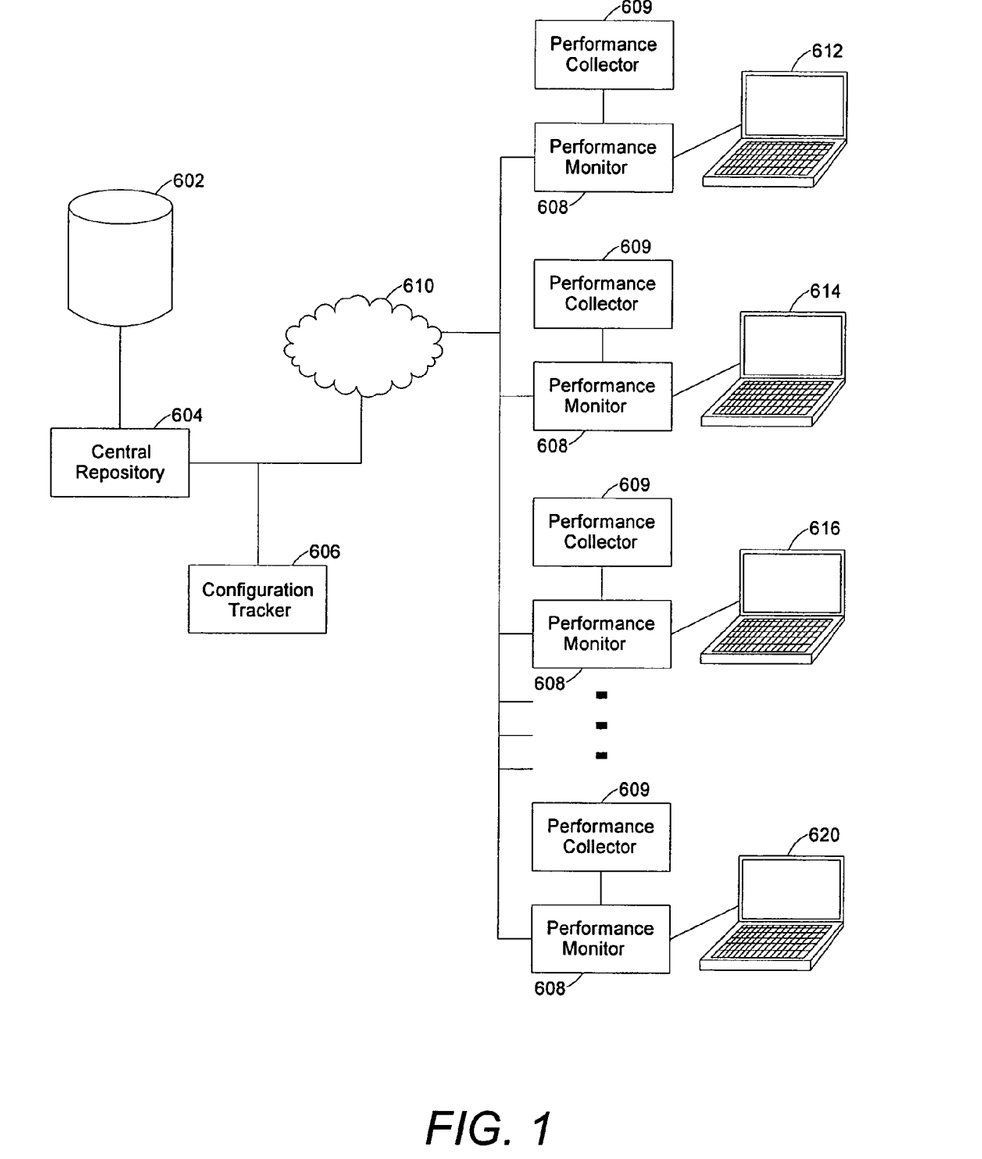
FIG. 1 is a diagram depicting a system having a configuration tracker and a performance monitor in accordance with an exemplary embodiment.

FIG. 1 illustrates a system having a configuration tracker and performance monitor for adjusting the relative value of system configuration recommendations of a system in an enterprise. In the system, configuration information is obtained for computer systems on a network. Configuration information can be obtained using a monitoring program such as the High Available Observatory ("HAO") software described below. The monitoring program automatically polls computer systems for configuration information. Alternatively, configuration information can be manually entered by a technician or expert. Once obtained, configuration information is stored in a database.

In the system, performance data is obtained for the computer systems on the network. Performance information can be obtained using a monitoring program (such as the HAO software described below) that automatically polls computer system performance. Such automatic polling can be performed periodically, randomly, or when configuration changes are made. Alternatively, performance information can be obtained and/or entered manually. Once obtained, performance information is preferably stored in a database. When configuration changes are made, new configuration information and new performance information are obtained and the effectiveness of configuration changes are assessed. In general, effective configuration changes result in improved performance.

In an exemplary embodiment, rules are developed from knowledge obtained through interviews with systems performance experts and stored in a database 602. These rules define configuration settings that are symptomatic of system performance problems along with recommended corrective actions. These rules also define recommended configuration changes to optimize or maximize system performance. Preferably, the system performance is keyed off of specific configuration parameters.

Performance monitoring software, hereafter referred to as a performance monitor 608, is installed on each monitored system. The performance monitor 608 can be the HP Measure Ware product available from Hewlett-Packard Company. In an alternative embodiment, the performance monitor 608 is located at an enterprise level instead of on each monitored system. A configuration-tracking infrastructure, hereafter referred to as configuration tracker 606, is installed. The configuration tracker 606 is capable of monitoring configuration changes on the systems in a customer environment and delivering those changes to a central repository where the rules are implemented. The configuration tracker 606 can be the HP Configuration Tracker product, which is part of the High Availability Observatory ("HAO") that collects configuration changes and transmits them from the customer site to a central site.

A performance data collection utility, hereafter referred to as a performance collector 609, is installed on the monitored systems (e.g. computers 612, 614, 616, and 620). The configuration tracker 606 can invoke the performance collector 609 on a daily basis. The performance collector queries the performance monitor 608 and extracts various performance metrics. In addition, the configuration tracker 606 collects other configuration parameters on a daily basis. The performance metrics and configuration parameters are sent to a central repository 604 via the configuration tracker. At the central repository 604, the data is accumulated in the database 602 or other memory structure. Over time, the performance metrics describe a performance baseline for the monitored system.

Newly collected performance metrics can be compared to the baseline. If the new metrics statistically deviate from the performance baseline, the configuration tracker 606 is queried to identify configuration changes that occurred prior to the performance change and may have contributed to the change in performance. Exemplary methods of identifying configuration changes are described in U.S. Pat. No. 6,282,175 entitled "Method for Tracking Configuration Changes in Networks of Computer Systems Through Historical Monitoring of configuration Status of Devices on the Network," incorporated herein by reference in its entirety, and assigned to the same assignee as the present application.

Advantageously, whether or not the observed configuration changes are, in fact, relevant to the performance change is initially unimportant. If the performance change is an improvement, the factors are tagged as likely to elicit better performance on a customer's system. Likewise, if performance degrades following the configuration change, the contributing factors are tagged as likely to diminish performance. The repository of such tagged factors is linked to the rule base through the configuration parameters common to each. Various kinds of automated or manual analysis can be applied to the collected configuration and performance data.

One example embodiment automatically compares the configuration settings for a system against the norms for other similar systems hosting similar applications and notifies support personnel or customers of settings that deviate statistically from the norms along with the normal settings. Another example embodiment compares newly received performance metrics against the performance baselines and queries the data warehouse for antecedent configuration changes. Keyed off these configuration changes, one or more corrective actions from the rule base can be proposed to the customer, incorporating configuration changes that were tagged as resulting in improved system performance.

After analysis is completed and recommendations delivered, the configuration tracker 606 identifies configuration changes that are actually implemented and collects new performance metrics. The new performance metrics define new baselines which can be compared to the performance baselines prior to the implementation of the corrective action. The results are used to weight the effectiveness of the implemented advice. Heavily weighted recommendations (i.e. those which were implemented and resulted in performance improvements) are prioritized in future recommendation sets. Less effective recommendations are offered only secondarily or are dropped altogether, thereby improving the value of the automatically generated performance recommendations.

The advice and corrective actions recommended to customers is automatically reprioritized such that the most effective and most likely to be implemented recommendations are identified and offered first, using the automated self-correcting and self-adjusting system described, thereby improving the value of the advice offered to customers. The advice is also improved in that it is tied to specific, observed configuration changes. In addition, the system and method quantify the effectiveness of advice using performance metrics. Utilization of this technology and gathering metrics to present to customers about the effectiveness of the advice given provides self-correcting/self-tuning features.

In another exemplary embodiment, a reporting capability summarizes the recommended actions that were identified for a customer, the configuration changes that were implemented and the resulting change in performance. The reporting can describe performance trends that have continued on systems where none of the recommended actions were implemented.

Figure 2:
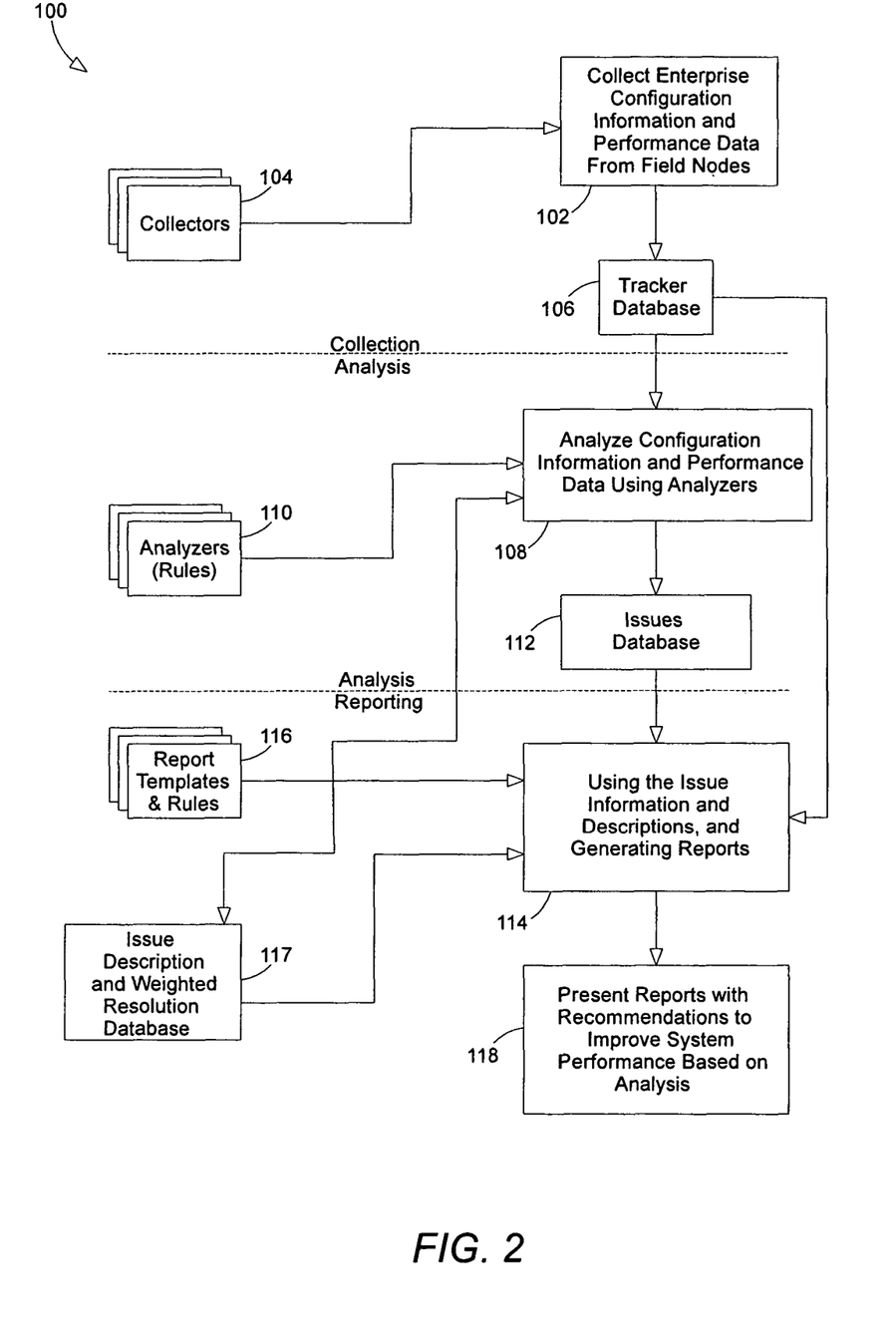
FIG. 2 is a block diagram of an enterprise analyzer system that periodically collects information from the nodes in an enterprise in accordance with an exemplary embodiment.

Referring to FIG. 2, an overview block diagram is shown of an automated method 100 for analyzing the configuration of an enterprise. The method 100 may generally be broken into three stages: collection, analysis, and reporting, as is shown in FIG. 2 by dashed lines.

In an operation 102, enterprise configuration information and performance data is collected from field nodes. The collection operation utilizes a set of collectors 104 to gather the desired configuration and performance information. The collectors 104 are commands or programs stored on a support node in the enterprise. The collectors 104 can be run at periodic intervals on each node of the enterprise. The collectors 104 gather desired configuration and performance information and store it in the tracker database 106. Specifically, for each node, there is configuration information and performance information stored on the tracker database 106 associated with each and every collector that generates configuration and performance information.

In an operation 108, configuration information and performance information are analyzed by an analyzer harness 806 (FIG. 3) to identify issues within the field nodes. As part of this process, the analyzers 110 are used to investigate particular issues associated with the field nodes. The analyzers 110 are developed or written by experts to identify an issue or issues. The experts possess knowledge and information which is captured in written form as analyzers addressed to specific issues. The analyzers are then stored in an analyzer database 804 (FIG. 3) for later use by the analyzer harness 806.

Figure 3:
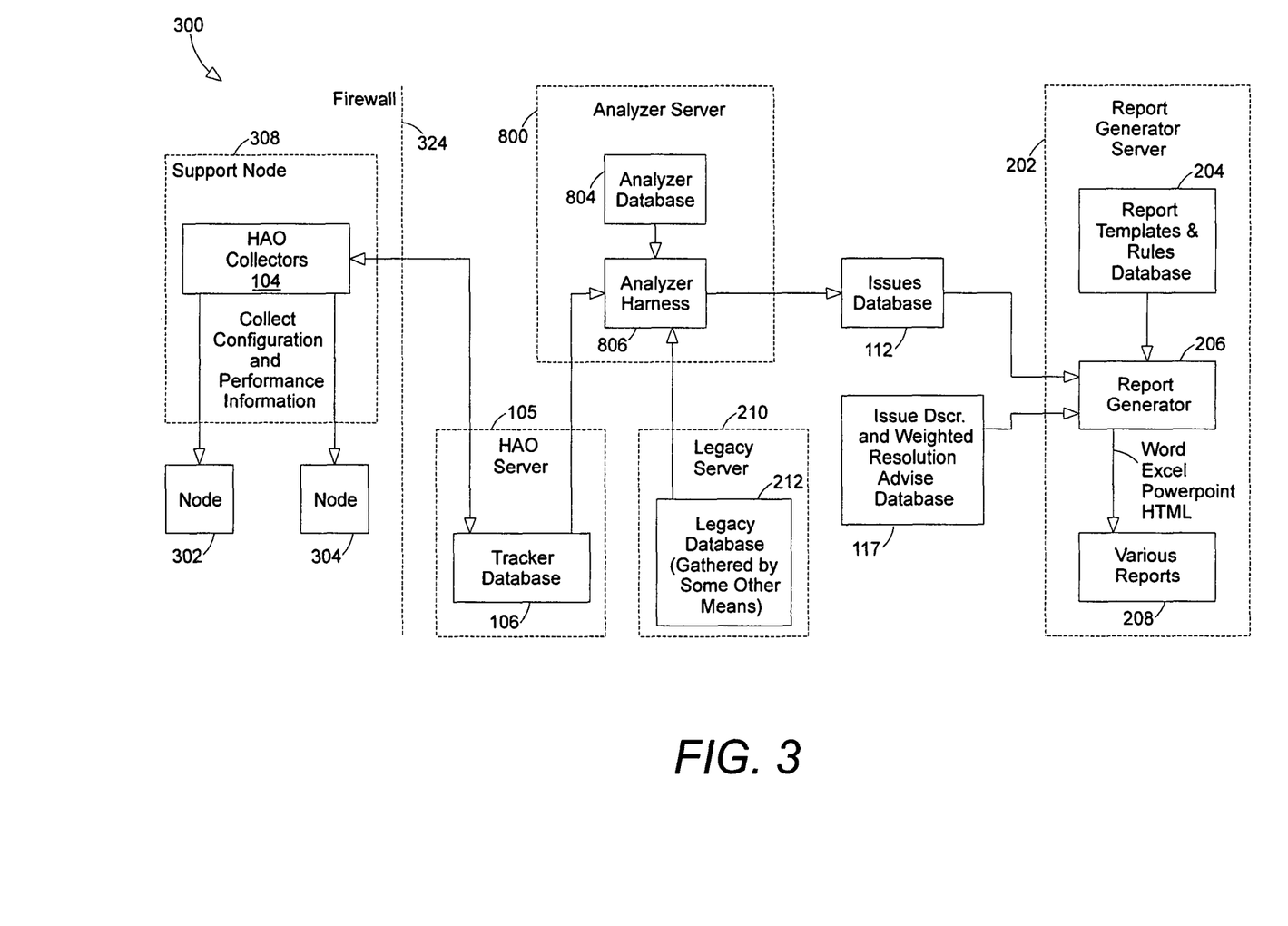
FIG. 3 is a block diagram illustrating the nodes in an enterprise linked to an analyzer server and a report generator server in accordance with an exemplary embodiment.

The analyzer harness 806 executes the desired analyzer 110 with the configuration information and/or performance information stored in the tracker database 106. The analyzer harness 806 can generate a report, identifying issues relating to the field nodes. This issue identifying report is stored in an issue database 112. If an issue has not arisen with respect to any node, the issue will be absent from the report.

At this stage, the report generated by operation 108 may be used to generate a full report along with text descriptions of the issues. The report from the analyzer harness 806 is sent to a report generator 206 (FIG. 2). The report generator 206 may use report templates and rules database 204 to generate reports 208 (FIG. 3) addressing specific issues for each field node. These reports 208 can identify the analyzers 110 used, the node from which the collector information is gathered, the actual output of the collector 104, and/or the issue identified.

In an operation 114, issues are analyzed using rules written by the experts, and a report is generated. Generally speaking, the reports are generated from templates stored in the report templates and rules database 204. The reports may be presented in an operation 118 with recommendations to improve system performance based on analysis of field node configuration, performance baselines, current performance metrics, and prioritized advice.

FIG. 3 illustrates a block diagram for implementing the operations described with reference to FIGS. 1 and 2. An enterprise 300 is located on a customer site, including a support node 308 which may be operated by the manufacturer of the computers at the customer site. The support node 308 includes the customary components of a computer system including a CPU, a display or other I/O device, a network or communications interface, RAM or ROM or other memory, as well as stable storage devices such as disk or CD-ROM drives. Other servers or nodes described may also include the same customary components.

Software known as High Availability Observatory ("HAO") available from Hewlett-Packard, Company is stored on the support node 308, and it manages the collectors 104 that gather configuration and performance information. In the enterprise 300, the support node 308 is connected to the nodes 302 and 304 by a network which enables the collectors 104 to gather configuration and performance information. Use of a support node in this manner is one of many ways in which configuration and performance information may be collected and subjected to analysis.

FIG. 3 also illustrates the components located at a central site. The central site includes an analyzer server 800 situated remote from the enterprise 300. The analyzer server 800 is linked (in this embodiment, indirectly through the tracker database 106 as is shown in FIG. 3) to the enterprise 300 via a network. An HAO server 105, a report generator server 202, and a legacy server 210 are also part of the central site. The HAO server 105 is linked to the support node 308 by the network. Configuration information and performance information gathered by the collectors 104 are saved in a tracker database 106. This data is retrieved from the tracker database 106 by the analyzer server 800, as is described below.

The analyzer server 800 includes an analyzer database 804 which stores the analyzers 110 and an analyzer harness 806 for wrapping the analyzers 110 retrieved from the analyzer database 804 with the configuration information and performance information retrieved from the tracker database 106. The analyzer harness 806 generates an issue report file which is placed into the issues database 112.

The legacy server 210 includes a legacy database 212. The legacy database 212 stores configuration and performance information files obtained during prior manual collections or other means. The legacy database 212 can be linked to the analyzer harness 806. In the event that the HAO collectors 104 are unavailable or not present to automatically and continually gather configuration and performance information, configuration and performance information can be retrieved from the legacy database 212. This information, however, is only as current as the most recent collection. But other automated techniques may be used to place node configuration and performance information into the legacy database 212. The HAO collectors 104 is one way in which configuration and performance information may be gathered from an enterprise.

The report generator server 202 is also a part of the central site. The report generator server 202 is linked to the analyzer server 800 through the issues database 112. The report generator server 202 includes a report generator 206 for receiving the issue reports from the database 112. As discussed above with respect to FIG. 1, the report generator 206 may generate a full report concerning the identified issues including more detailed information about each issue.

A report templates and rules database 204 is part of the report generator server 202. The server 202 stores various report templates and rules which are developed by subject matter experts. These experts can be field personnel or product development personnel. The application of these rules helps to determine the overall performance of the enterprise 300. The report generator 206 can retrieve the rules from the report templates and rules database 204 and the issues stored in the issues database 112. The report generator 206 generates a report 208 using the templates from the report templates and rules database 204. The report may be in any desired format, such as Microsoft Word, Excel, PowerPoint, or HTML or in some special format designed for delivery to some other computer or node for use in automatic control. The report may identify issues with the enterprise 300 to find specific opportunities to improve the overall performance of the enterprise 300.

With reference once again to FIG. 2, the collectors 104 are commands or sets of commands that can run on each of the nodes of an enterprise, testing the configurations of those nodes, both static and dynamic, and generating collector reports reporting their findings. At step 102, the reports generated by these collectors, in the form of files, are collected and are transmitted to a centralized tracker database 106 where they are stored. Many types of collectors can be used in this manner. A family of collectors 104 that are run at a particular enterprise site are defined by the service engineers at that site and may be the very same programs that the service engineers run when they visit the site and manually run tests to learn about the system configuration.

Figure 4:
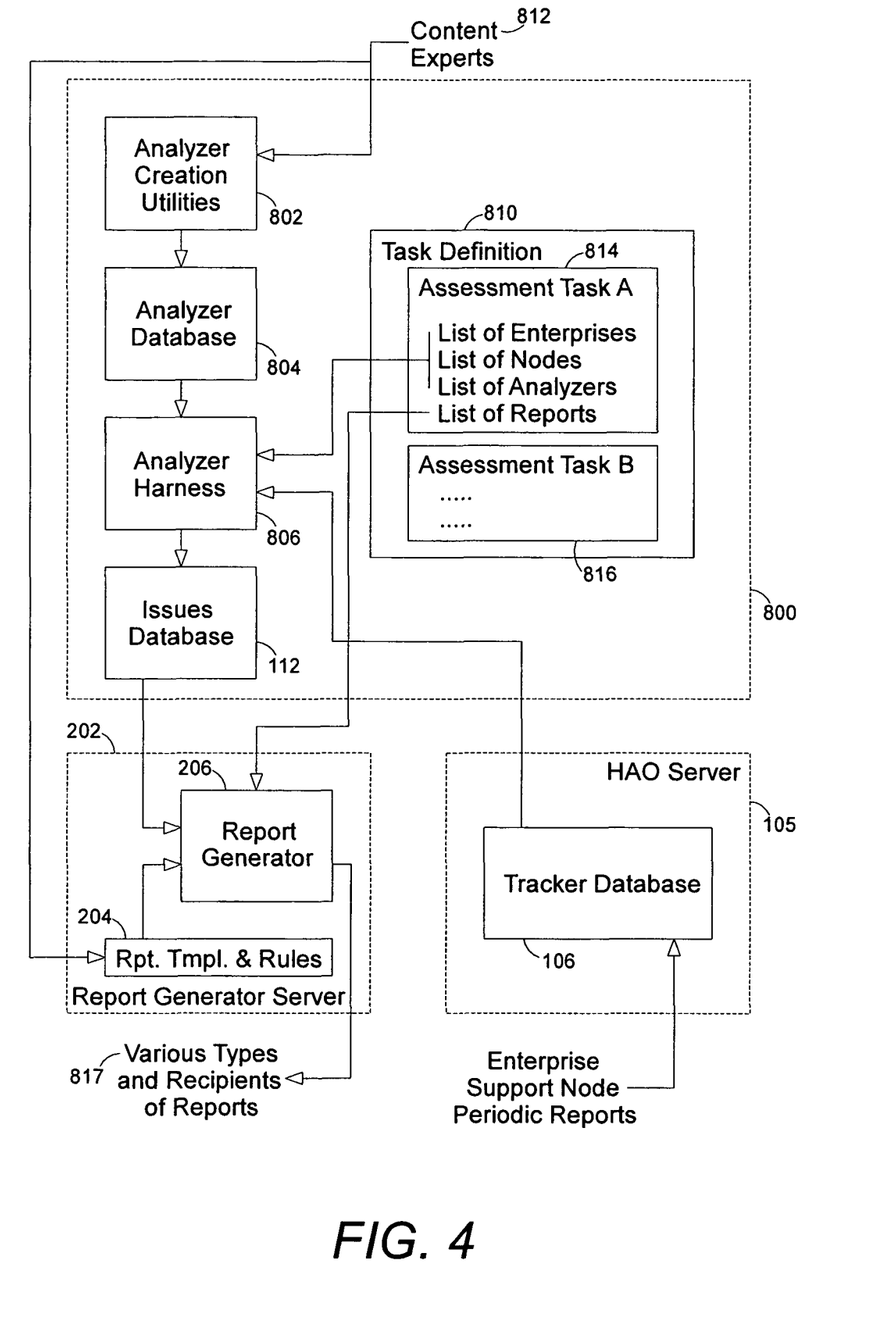
FIG. 4 is a block diagram of an analysis server together with certain elements of the report generator server and an high availability observatory (HAO) Server in accordance with an exemplary embodiment.

FIG. 4 illustrates an exemplary analysis process. The analyzer server 800 is shown at the top of the figure and contains the analyzer database 804 and the analyzer harness 806. In the lower right portion of FIG. 4, the HAO server 105 is shown which contains the tracker database 106 that contains configuration and performance information with respect to the nodes 302 and 304, etc. in the enterprise 300. To the left in FIG. 4, the report generator server 202 is shown together with the database 204 that contains the report templates and rules and the report generator 206.

Report generation rules and templates 116 generate the reports 208. As shown in FIG. 4, content experts 812 use analyzer creation utilities 802 to create the various documents that define the analyzers 110 and store them in the analyzer database 804. These and other content experts 812 also generate the rules that govern report generation as well as the templates for the reports, and they store them in the database 204 within the report generator server 202.

Once the analyzers 110 are created and installed and the report templates and rules 116 are put in place, the system may then be called upon to do an assessment of the enterprise 300. At 814, an assessment task A is shown. The assessment task 814 includes, in its definition, a list of the enterprises that are to be analyzed, a list of the nodes at each enterprise which are to be subjected to analysis, and a list of the analysis that is to be performed in the form of the actual names of the analyzers which are to be executed. In addition, the assessment task 814 includes a list of the reports that are to be generated following the analysis. Report generation may be done at the time of the analysis, or the reports may be generated at a later time in a separate session.

Once a task 814 is defined and initiated, the list of enterprises, nodes, and analyzers are passed to the analyzer harness 806. The analyzer harness 806 then proceeds by picking up the analyzers 110 from the database 804, one at a time, and with each analyzer 110 the analyzer harness 806 proceeds through the nodes 302, etc. one at a time. For each node, the harness 806 creates a framework linking the analyzer 110 to configuration and performance information files that are retrieved from the tracker database 106. Using this framework, the harness 806 wraps the analyzer 110 in this environment and causes it to be executed in the context of the list of configuration and performance information files that contain configuration and performance information gathered from the node 302 that is being currently analyzed.

During its execution, the analyzer 110 calls upon special subroutines that generate reports of any issue which warrants management attention and also of any error condition which may arise. After the analyzer 110 terminates, the analyzer harness 806 takes these issue reports and expands them, using issue text templates retrieved from the analyzer database 804 and also information as to the identity of the node and the identity of the assessment task, and creates an expanded report which is stored in the issues database 112 after the analysis have been run against all of the nodes 302, etc. In this manner, an extended issue report is generated in a format that is both human readable and also that lends itself to being incorporated into a database for automated retrieval and manipulation.

The list of reports from the task definition 814 is passed to the report generator 206. The report generator 206 also has access to the report templates and rules database 204 and to the issue report which can be retrieved from the issues database 112. Using all of these materials, an expert system engine within, or supplementing, the report generator 206 evaluates the rules and, under their guidance, examines the issue information, generating high-level conclusions for management concerning the general state of the enterprise. Then, using the report templates, the report generator 206 prepares a variety of reports, as has been explained, setting forth the status of the enterprise 300 and its nodes 302, etc. These are then fed to various recipients of the reports 817.

Figure 5:
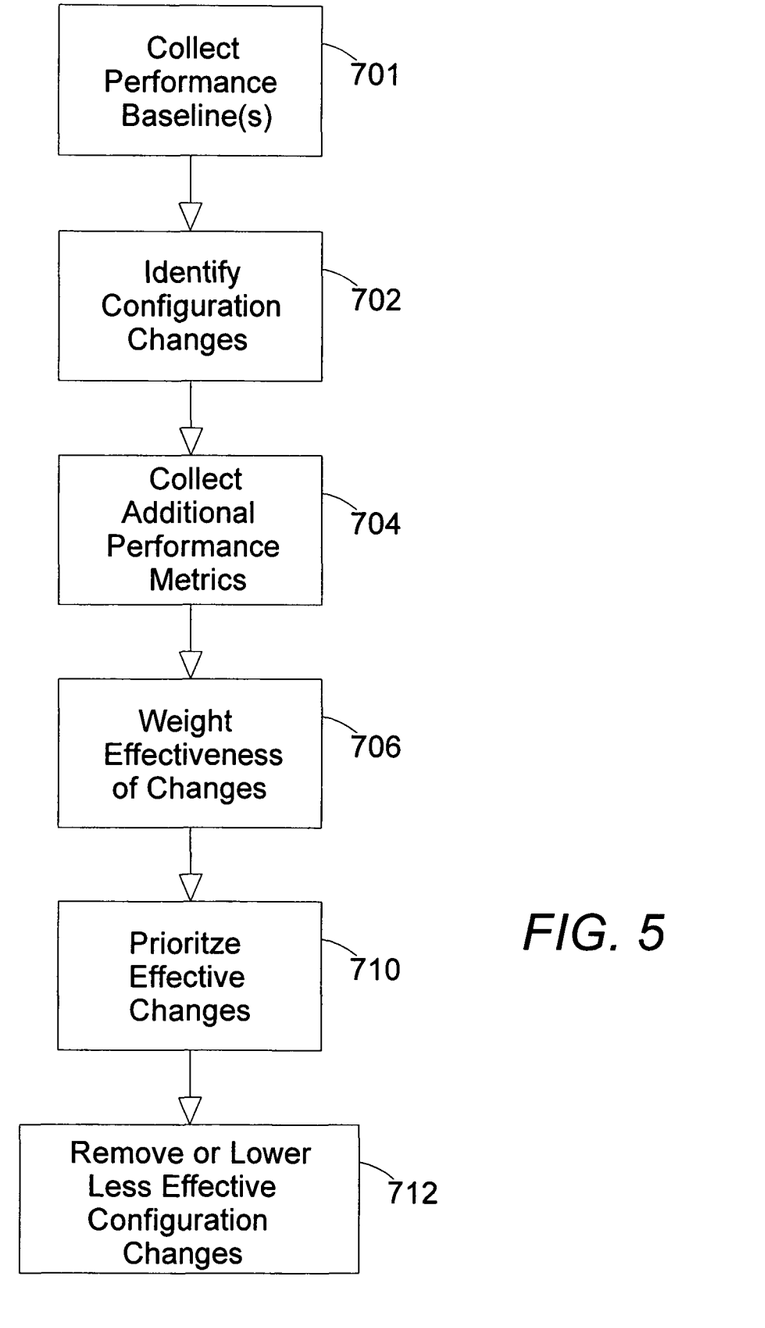
FIG. 5 is a flow diagram of operations performed in a process of assessing relative value of possible system configuration changes for a system in a group of networked systems in accordance with an exemplary embodiment.

FIG. 5 illustrates exemplary operations performed to adjust the relative value of possible system configuration changes for a system in a group of networked systems. In an operation 701, one or more performance baselines are collected. Performance baselines can be collected from performance collector and/or monitor software applications installed locally or on the network. In an operation 702, configuration changes made to a system are identified. Configuration changes can be identified using a configuration tracking software application installed locally or on the network. In an operation 704, additional performance metrics are obtained for the system having implemented configuration changes. Performance metrics can be obtained using a performance collector software application installed at a monitored system.

The results of the performance measurements are used in an operation 706 to weight the effectiveness of an implemented configuration change. Weighting configuration changes involves providing a weighting value or number that represents the relative value of performance improvement based on implementation of a configuration change compared to performance improvements from other configuration changes. In an operation 710, configuration changes with heavy weighting are prioritized above lesser configuration changes. Less effective configuration changes are removed from a set of possible configuration changes or dropped in priority relative to others in that set during an operation 712.

Figure 6:
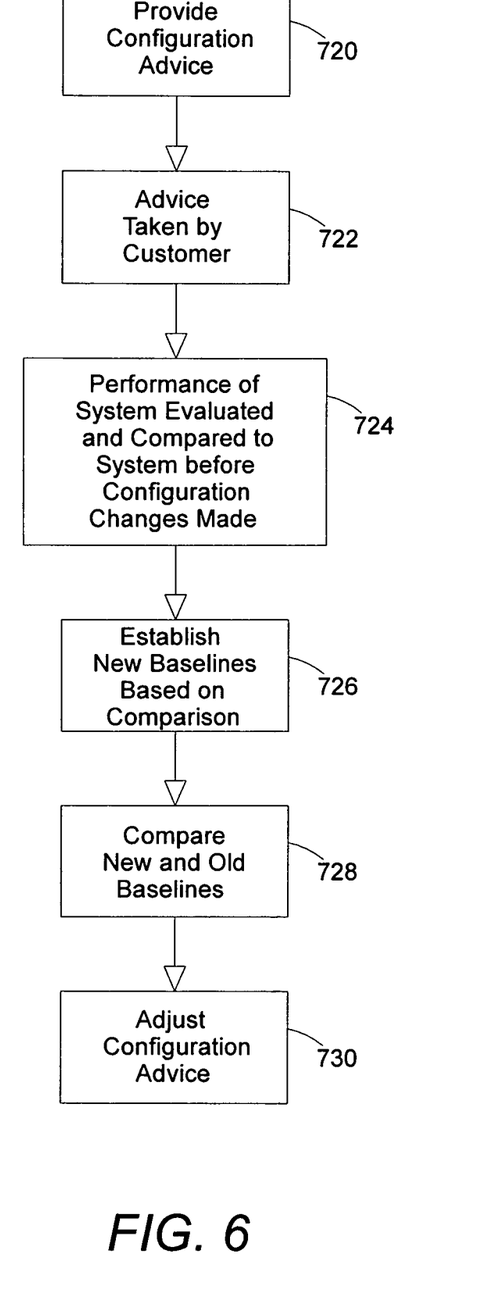
FIG. 6 is a flow diagram of operations performed in a process of adjusting system configuration advice based on advice implementation in accordance with an exemplary embodiment.

FIG. 6 illustrates exemplary operations performed to adjust the value of a configuration change recommendation compared to other recommendations according to another exemplary embodiment. Advice is provided for configuring a computer system in an operation 720. Such advice can be provided as a list of recommended configuration changes to a system coupled to a network. This list of recommendations can have an order of priority based on effectiveness. In an operation 722, a recommended configuration change is made by a customer. After the configuration change, the performance of the customer's system is evaluated and compared to the pre-configuration change system in an operation 724. Results of the comparison of operation 724 are used in an operation 726 to establish new configuration baselines of performance to configuration. These new baselines are compared to old baselines in an operation 728 and future advice is adjusted based on the results of the comparison in an operation 730.

The foregoing description of an embodiment of the invention has been presented for purposes of illustration and description. It is not intended to be exhaustive or to limit the invention to the embodiment disclosed, and modifications and variations are possible in light of the above teachings or may be acquired from practice of the invention. The embodiments were chosen to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method of adjusting relative value of implemented computer configuration changes, the method comprising:

identifying computer configuration changes in a computer system, the computer configuration changes being identified by using a configuration tracking application installed either locally on the computer system or on a network on which the computer system is communicatively connected;

obtaining performance metrics for the computer system before and after computer configuration changes implemented in the computer system, the performance metrics being obtained by a performance collector application installed on the computer system; and assessing effectiveness of the computer configuration changes based on the obtained performance metrics, wherein the assessing is made by assigning a weight value that represents a relative value of performance improvement based on implementation of each of the computer configuration changes as compared to performance improvements from other configuration changes; and the method further comprising: receiving a user input with respect to which ones of a plurality of collectors are to be utilized to obtain the performance metrics for the computer system, the plurality of collectors providing an additional role of running tests on various components of the network.

2. The method of claim 1, further comprising increasing priority values for computer configuration changes resulting in performance improvements, the priority values being used for priority of the computer configuration changes in future recommendation sets.

3. The method of claim 1, further comprising removing computer configuration changes not resulting in performance improvements from future recommendation sets.

4. The method of claim 1, further comprising summarizing recommended actions identified for a computer user, configuration changes implemented, and the resulting change in performance.

5. The method of claim 1, further comprising providing a report with performance trends on a plurality of computer systems where recommended configuration changes are not implemented.

6. A method of adjusting relative value of implemented computer configuration changes, the method comprising:

identifying computer configuration changes in a computer system, the computer configuration changes being identified by using a configuration tracking application installed either locally on the computer system or on a network on which the computer system is communicatively connected;

obtaining performance metrics for the computer system before and after computer configuration changes implemented in the computer system, the performance metrics being obtained by a performance collector application installed on the computer system; and assessing effectiveness of the computer configuration changes based on the obtained performance metrics, wherein the assessing is made by assigning a weight value that represents a relative value of performance improvement based on implementation of each of the computer configuration changes as compared to performance improvements from other configuration changes; and the method further comprising:

comparing the performance metrics obtained in the obtaining step against performance baselines stored beforehand; and based on the comparing, querying a data warehouse for antecedent configuration changes.

7. The method of claim 6, further comprising analyzing computer metrics on the computer system and proposing configuration changes based on the analysis of computer metrics.

8. A system comprising:
hardware components in a computer system;
installed software in the computer system;
configuration settings indicating configuration conditions for the hardware components and the installed software; and programmed instructions to:
identify implemented configuration changes in the computer system, the configuration changes being identified by using a configuration tracking application installed either locally on the computer system or on a network on which the computer system is communicatively connected;

collect performance metrics associated with the computer system having the identified implemented configuration changes, the performance metrics being collected by a performance collector application installed on the computer system; and weight effectiveness of the identified implemented configuration changes, wherein a weight value is assigned that represents a relative value of performance improvement based on implementation of each of the identified implemented configuration changes as compared to performance improvements from other configuration changes; and the identify programmed instructions further comprising: receiving a user input with respect to which ones of a plurality of collectors are to be utilized to obtain the performance metrics for the computer system, the plurality of collectors providing an additional role of running tests on various components of the network.

9. The system of claim 8, wherein the programmed instructions are to analyze the computer system and propose configuration changes based on the analysis.

10. The system of claim 9, wherein the proposed configuration changes are prioritized based on weighted effectiveness.

11. The system of claim 8, wherein the computer system is one of a plurality of computer systems coupled to a common network, and wherein the identified implemented configuration changes correspond to configuration change proposals established based on performance analysis of identified configuration changes in other computer systems in the plurality of computer systems coupled to the common network.

12. A system comprising:
hardware components in a computer system;
installed software in the computer system;
configuration settings indicating configuration conditions for the hardware components and the installed software; and programmed instructions to:
identify implemented configuration changes in the computer system, the configuration changes being identified by using a configuration tracking application installed either locally on the computer system or on a network on which the computer system is communicatively connected;

collect performance metrics associated with the computer system having the identified implemented configuration changes, the performance metrics being collected by a performance collector application installed on the computer system; and weight effectiveness of the identified implemented configuration changes, wherein a weight value is assigned that represents a relative value of performance improvement based on implementation of each of the identified implemented configuration changes as compared to performance improvements from other configuration changes, wherein the programmed instructions are further to:

compare the performance metrics obtained in the collecting step against performance baselines stored beforehand; and based on the comparing, query a data warehouse for antecedent configuration changes.

13. The system of claim 12, wherein the computer system is one of a plurality of computer systems coupled to a common network, wherein the identified implemented configuration changes correspond to configuration change proposals established based on performance analysis of identified configuration changes in other computer systems in the plurality of computer systems coupled to the common network, and wherein the configuration change proposals have a priority based on the weighted effectiveness of the identified implemented configuration changes.

14. A system implemented on at least one computer for adjusting relative value of implemented configuration changes on computer systems in a network, the system comprising:

means for obtaining configuration information for the computer systems in the network, the configuration information being obtained by using a plurality of collectors installed either locally on the computer systems or on a network on which the computer systems are communicatively connected;

means for obtaining performance data for the computer systems in the network, the performance metrics being obtained by a performance collector application installed on the computer systems;

means for recommending configuration changes to one of the computer systems in the network;

means for obtaining performance data for the one of the computer systems after implementation of recommended configuration changes; and means for adjusting relative value of the recommended configuration changes based on an evaluation of the performance data after implementation of recommended configuration changes, wherein the relative value is adjusted by utilizing a weight value that represents a relative performance improvement based on implementation of each of the recommended configuration changes as compared to performance improvements from other configuration changes; and wherein configuration changes are recommended based on relative value where high value indicates performance improvement based on the configuration changes, wherein the means for obtaining configuration information further comprises: receiving means for receiving a user input with respect to which ones of a plurality of collectors are to be utilized to obtain the performance metrics for the computer systems, the plurality of collectors providing an additional role of running tests on various components of the network.

* * * * *